US012602326B2

(12) United States Patent
Lee et al.

(10) Patent No.: US 12,602,326 B2
(45) Date of Patent: Apr. 14, 2026

(54) STORAGE DEVICE AND OPERATION METHOD THEREOF

(71) Applicant: SK hynix Inc., Gyeonggi-do (KR)

(72) Inventors: Seon Ju Lee, Gyeonggi-do (KR); Jeong Sun Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/328,774

(22) Filed: Jun. 5, 2023

(65) Prior Publication Data

US 2024/0232087 A1 Jul. 11, 2024

(30) Foreign Application Priority Data

Jan. 5, 2023 (KR) ........................ 10-2023-0001487

(51) Int. Cl.
*G06F 12/08* (2016.01)
*G06F 12/0855* (2016.01)
(52) U.S. Cl.
CPC .. *G06F 12/0855* (2013.01); *G06F 2212/1016* (2013.01); *G06F 2212/45* (2013.01)
(58) Field of Classification Search
CPC ..................... G06F 12/0855; G06F 2212/1016
USPC ......................................................... 711/140
See application file for complete search history.

(56) References Cited

U.S. PATENT DOCUMENTS 10,175,891 B1 * 1/2019 Malwankar ........... G06F 3/0611
11,586,385 B1 * 2/2023 Lercari ...................... G06F 1/30

11,789,819 B1 * 10/2023 Simionescu ........... G11C 29/50
714/6.11
2016/0170639 A1 * 6/2016 Velayudhan .......... G06F 3/0689
711/114
2017/0109096 A1 * 4/2017 Jean ....................... G06F 3/0679
2018/0011642 A1 * 1/2018 Koseki ................ G06F 11/1076
2019/0188156 A1 * 6/2019 Sampathkumar ..... G06F 12/128
2020/0042470 A1 * 2/2020 Lee ........................ G06F 3/0604

FOREIGN PATENT DOCUMENTS

KR        10-1014599 B1    2/2011
KR    10-2013-0075135 A    7/2013

* cited by examiner

*Primary Examiner* — Gautam Sain

(74) *Attorney, Agent, or Firm* — IP & T GROUP LLP

(57) ABSTRACT

Disclosed is an operation method of a storage device, which is for providing an optimal program/read efficiency in the storage device. The operation method includes: receiving program commands that request data write and data to be written from at least one first outside; storing sequentially the program commands in a command queue in the order in which they are received and storing in a temporary buffer, the data to be written; selecting one program command from among the program commands stored in the command queue; determining whether the selected program command is a continuous data program command or a discontinuous data program command; and allocating, if the selected program command is the continuous data program command, data to be written of the continuous data program command to an entire area of a stripe that is a memory area formed over a plurality of dies included in a second outside.

18 Claims, 12 Drawing Sheets

START

S310 — RECEIVE COMMAND AND DATA FOR EACH PF

S320 — QUEUE COMMAND AND STORE DATA IN TEMPORARY BUFFER

S330 — GENERATE MEMORY CONTROL COMMAND BASED ON QUEUED COMMAND

S340 — PERFORM ALL OPERATIONS ACCORDING TO GENERATED MEMORY CONTROL COMMAND

END

| PCMD SELECTION SEQUENCE | CONTINUOUS DATA | SIZE OF DATA |
|---|---|---|
| PCMD 1 | 0 | 2 |
| PCMD 2 | 0 | 4 |
| PCMD 3 | 0 | 7 |
| PCMD 4 | 1 | 18 |
| PCMD 5 | 0 | 3 |

ST1

| |
|---|
| PCMD 1 |
| PCMD 2 |
| PCMD 2 |
| PCMD 3 |
| PCMD 1 |
| PCMD 2 |
| PCMD 2 |
| PCMD 3 |

620

| PCMD SELECTION SEQUENCE | CONTINUOUS DATA | SIZE OF DATA |
|---|---|---|
| PCMD 3 | 0 | 5 |
| PCMD 4 | 1 | 18 |
| PCMD 5 | 0 | 3 |
| PCMD 6 | 1 | 11 |
| PCMD 7 | 0 | 4 |

| PCMD SELECTION SEQUENCE | CONTINUOUS DATA | SIZE OF DATA |
|---|---|---|
| PCMD 3 | 0 | 5 |
| PCMD 4 | 1 | 18 |
| PCMD 5 | 0 | 3 |
| PCMD 6 | 1 | 11 |
| PCMD 7 | 0 | 4 |

| ST2 | ST1 |
|---|---|
| PCMD 4 | PCMD 1 |
| PCMD 4 | PCMD 2 |
| PCMD 4 | PCMD 2 |
| PCMD 4 | PCMD 3 |
| PCMD 4 | PCMD 1 |
| PCMD 4 | PCMD 2 |
| PCMD 4 | PCMD 2 |
| PCMD 4 | PCMD 3 |

630

| PCMD SELECTION SEQUENCE | CONTINUOUS DATA | SIZE OF DATA |
|---|---|---|
| PCMD 3 | 0 | 5 |
| PCMD 4 | 1 | 10 |
| PCMD 5 | 0 | 3 |
| PCMD 6 | 1 | 11 |
| PCMD 7 | 0 | 4 |

| PCMD SELECTION SEQUENCE | CONTINUOUS DATA | SIZE OF DATA |
|---|---|---|
| PCMD 3 | 0 | 5 |
| PCMD 4 | 1 | 10 |
| PCMD 5 | 0 | 3 |
| PCMD 6 | 1 | 11 |
| PCMD 7 | 0 | 4 |

| ST3 | ST2 | ST1 |
|---|---|---|
| PCMD 4 | PCMD 4 | PCMD 1 |
| PCMD 4 | PCMD 4 | PCMD 2 |
| PCMD 4 | PCMD 4 | PCMD 2 |
| PCMD 4 | PCMD 4 | PCMD 3 |
| PCMD 4 | PCMD 4 | PCMD 1 |
| PCMD 4 | PCMD 4 | PCMD 2 |
| PCMD 4 | PCMD 4 | PCMD 2 |
| PCMD 4 | PCMD 4 | PCMD 3 |

640

| PCMD SELECTION SEQUENCE | CONTINUOUS DATA | SIZE OF DATA |
|---|---|---|
| PCMD 3 | 0 | 5 |
| PCMD 4 | 0 | 2 |
| PCMD 5 | 0 | 3 |
| PCMD 6 | 1 | 11 |
| PCMD 7 | 0 | 4 |

| PCMD SELECTION SEQUENCE | CONTINUOUS DATA | SIZE OF DATA |
|---|---|---|
| PCMD 3 | 0 | 5 |
| PCMD 4 | 0 | 2 |
| PCMD 5 | 0 | 2 |
| PCMD 6 | 1 | 11 |
| PCMD 7 | 0 | 4 |

650

| PCMD SELECTION SEQUENCE | CONTINUOUS DATA | SIZE OF DATA |
|---|---|---|
| PCMD 5 | 0 | 3 |
| PCMD 6 | 1 | 11 |
| PCMD 7 | 0 | 4 |
|  |  |  |
|  |  |  |

| ST4 | ST3 | ST2 | ST1 |
|---|---|---|---|
| PCMD 3 | PCMD 4 | PCMD 4 | PCMD 1 |
| PCMD 3 | PCMD 4 | PCMD 4 | PCMD 2 |
| PCMD 3 | PCMD 4 | PCMD 4 | PCMD 2 |
| PCMD 4 | PCMD 4 | PCMD 4 | PCMD 3 |
| PCMD 3 | PCMD 4 | PCMD 4 | PCMD 1 |
| PCMD 3 | PCMD 4 | PCMD 4 | PCMD 2 |
| PCMD 4 | PCMD 4 | PCMD 4 | PCMD 2 |
| PCMD 5 | PCMD 4 | PCMD 4 | PCMD 3 |

FIG. 7

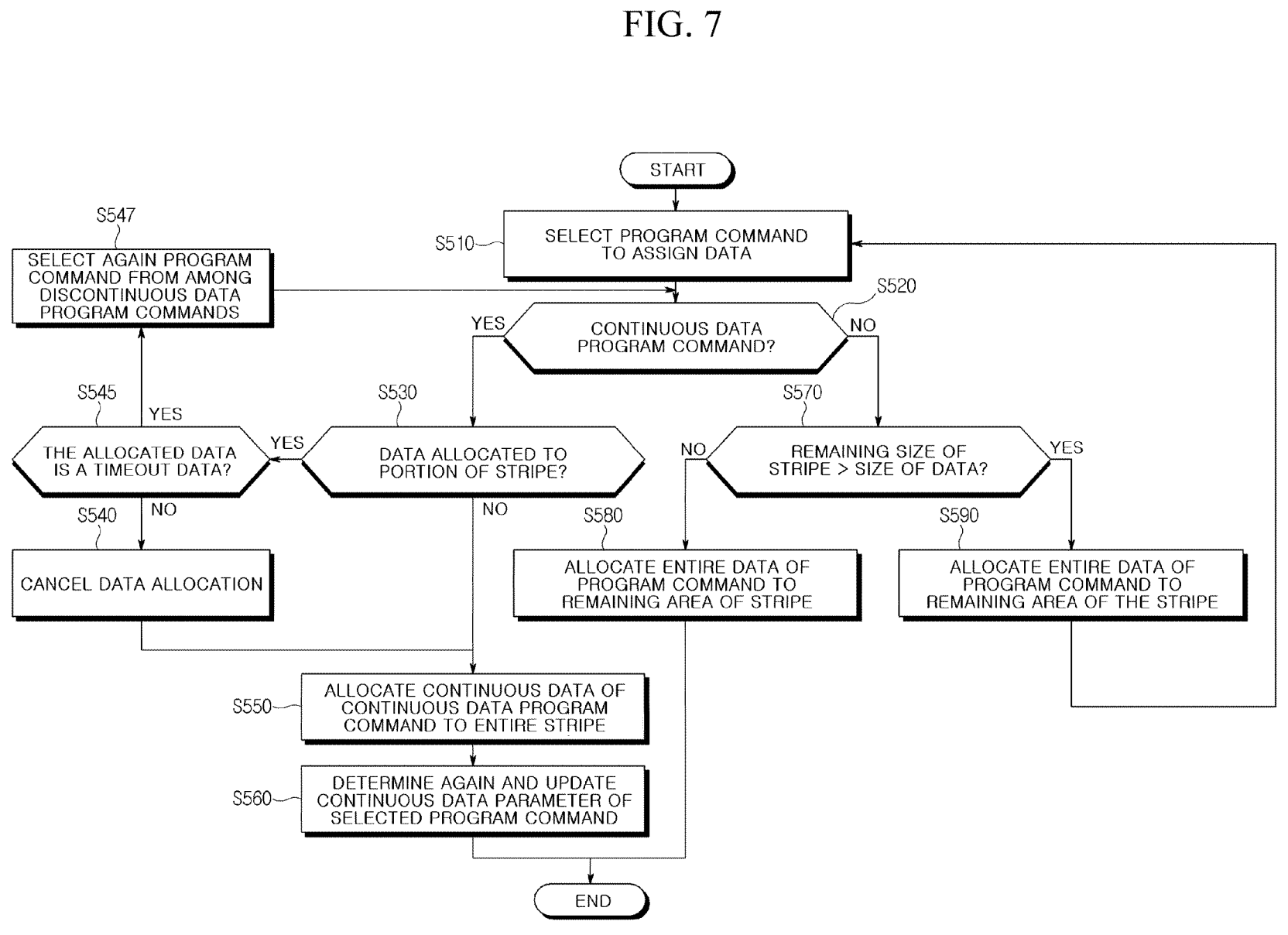

START

S510 — SELECT PROGRAM COMMAND TO ASSIGN DATA

S520 — CONTINUOUS DATA PROGRAM COMMAND?

YES →

S530 — DATA ALLOCATED TO PORTION OF STRIPE?

YES →

S545 — THE ALLOCATED DATA IS A TIMEOUT DATA?

YES →

S547 — SELECT AGAIN PROGRAM COMMAND FROM AMONG DISCONTINUOUS DATA PROGRAM COMMANDS

NO →

S540 — CANCEL DATA ALLOCATION

NO (from S530) →

S550 — ALLOCATE CONTINUOUS DATA OF CONTINUOUS DATA PROGRAM COMMAND TO ENTIRE STRIPE

S560 — DETERMINE AGAIN AND UPDATE CONTINUOUS DATA PARAMETER OF SELECTED PROGRAM COMMAND

END

NO (from S520) →

S570 — REMAINING SIZE OF STRIPE > SIZE OF DATA?

NO →

S580 — ALLOCATE ENTIRE DATA OF PROGRAM COMMAND TO REMAINING AREA OF STRIPE

YES →

S590 — ALLOCATE ENTIRE DATA OF PROGRAM COMMAND TO REMAINING AREA OF THE STRIPE

| PCMD SELECTION SEQUENCE | CONTINUOUS DATA | SIZE OF DATA |
|---|---|---|
| PCMD 3 | 0 | 5 |
| PCMD 4 | 1 | 10 |
| PCMD 5 | 0 | 3 |
| PCMD 6 | 1 | 11 |
| PCMD 7 | 0 | 4 |

810

| PCMD SELECTION SEQUENCE | CONTINUOUS DATA | SIZE OF DATA |
|---|---|---|
| PCMD 4 | 1 | 10 |
| PCMD 6 | 1 | 11 |
| PCMD 7 | 0 | 4 |
|  |  |  |
|  |  |  |

| ST3 | ST2 | ST1 |
|---|---|---|
| PCMD 3 | PCMD 4 | PCMD 1 |
| PCMD 3 | PCMD 4 | PCMD 2 |
| PCMD 3 | PCMD 4 | PCMD 2 |
| PCMD 5 | PCMD 4 | PCMD 3 |
| PCMD 3 | PCMD 4 | PCMD 1 |
| PCMD 3 | PCMD 4 | PCMD 2 |
| PCMD 5 | PCMD 4 | PCMD 2 |
| PCMD 5 | PCMD 4 | PCMD 3 |

STORAGE DEVICE AND OPERATION METHOD THEREOF

CROSS-REFERENCE TO RELATED APPLICATIONS

The present application claims priority to Korea Patent Application No. 10-2023-0001487, filed Jan. 5, 2023, the entire contents of which are incorporated herein for all purposes by this reference.

BACKGROUND

Field

Embodiments of the present disclosure relate to an operation method of a storage device, which is for providing an optimal program/read efficiency in the storage device.

Description of the Related Art

A storage device is capable of storing data on the basis of requests from a mobile terminal such as a computer, a smartphone, a tablet PC, etc., or an external device such as various electronic devices.

The storage device may include a memory and a memory controller for controlling the memory. The memory controller may receive a command from the external device, may read data from the memory on the basis of the received command, may write/program the data to the memory, or may perform or control operations for erasing the data of the memory.

A physical function (PF) means a PCIe device having all functions from a viewpoint of a host. The host may construct or control the PCIe device through the PF. Also, the PF can be regarded as one complete storage device. One PCIe device may have one PF to eight PFs. Each of the PFs are independent and may be regarded as a separate PCIe device from a viewpoint of software of the host.

When the storage device provides a multiple function NVME device (MFND) function seen as a plurality of the PFs, the host regards each of the PFs as an independent device. Therefore, independence must be ensured in the performance of the device. In order to obtain the performance, the device needs to operate in such a way that memory areas are shared instead of being allocated to each PF. That is, when the storage device provides the MFND function, data related to the plurality of PFs may be mixed and supplied to the storage device.

SUMMARY

The present disclosure is related to a data writing method in which a plurality of physical functions (PFs) write data sequentially to consecutive addresses. Thus, read performance can be maximized when reading is performed for each PF.

The technical problem to be overcome in the present disclosure is not limited to the above-mentioned technical problem. Other technical problems not mentioned can be clearly understood from those described below by a person having ordinary skill in the art.

One embodiment of the present disclosure is an operation method of a memory controller. The operation method may include: receiving program commands that request data write and data to be written from at least one first outside (e.g., external device 150); storing sequentially the program commands in a command queue in the order in which they are received and storing, in a temporary buffer, the data to be written; selecting one program command from among the program commands stored in the command queue; determining whether the selected program command is a continuous data program command or a discontinuous data program command; and allocating, if the selected program command is the continuous data program command, data to be written of the continuous data program command to an entire area of a stripe that is a memory area formed over a plurality of dies included in a second outside (e.g., memory 110).

To determine whether the selected program command is the continuous data program command or the discontinuous data program command, the selected program command is the continuous data program command when a size of the data to be written is greater than or equal to a size of the stripe and a logical address in which data specified by the selected program command is to be written is consecutive.

Another embodiment of the present disclosure is a storage device including: a memory device including a plurality of dies; and a memory controller which performs communication with at least one first outside, generates a signal for controlling operations of the memory device, receives program commands that request data write to the memory device and data to be written, from the at least one first outside, stores sequentially the program commands in a command queue in the order in which they are received, stores in a temporary buffer the data to be written, selects one program command from among the program commands stored in the command queue, determines whether the selected program command is a continuous data program command or a discontinuous data program command, and allocates, if the selected program command is the continuous data program command, the data to be written of the continuous data program command to an entire area of a stripe that is a memory area formed over a plurality of dies included in the memory device.

BRIEF DESCRIPTION OF THE DRAWINGS

FIGS. 6A to 6D are views showing an example in which a data arrangement operation of FIG. 5 is performed;

FIG. 7 is a flowchart showing a method for determining data to be stored a plane of each die of the memory while processing a time out program command with the highest priority in accordance with various embodiments of the present disclosure; and FIG. 8 is a view showing an example in which a data arrangement operation of FIG. 7 is performed.

DETAILED DESCRIPTION

Hereinafter, embodiments of the present disclosure will be described in detail with reference to the accompanying drawings.

Figure 1:
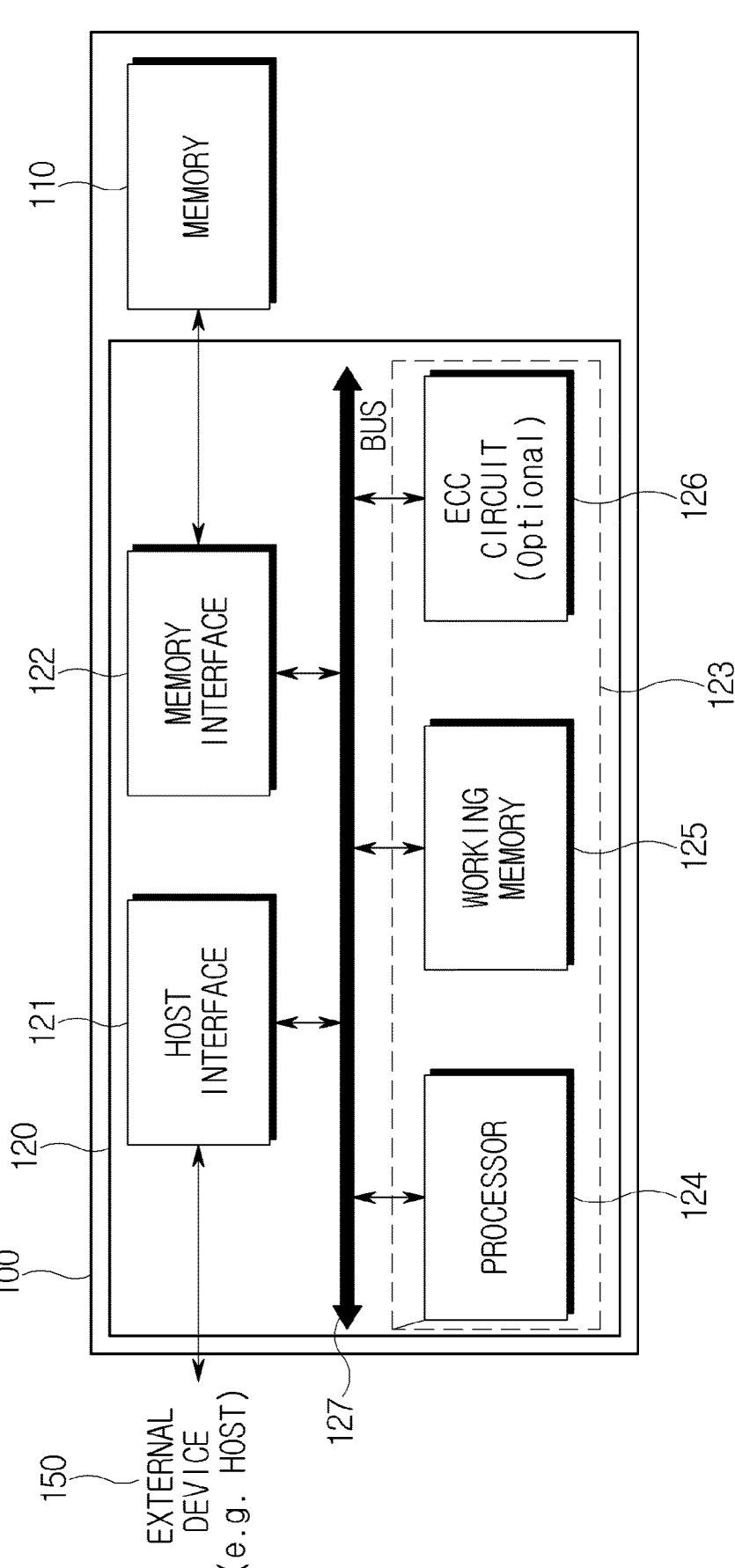
FIG. 1 shows schematically a configuration of a storage device according to various embodiments of the present disclosure.

FIG. 1 shows schematically a configuration of a storage device 100 according to various embodiments of the present disclosure.

Referring to FIG. 1, the storage device 100 according to the embodiments of the present disclosure may include a memory 110 that stores data and a controller 120 that controls the memory 110. In an embodiment, additional components may be further included in the storage device 100.

The memory 110 operates in response to the control of the controller 120. Here, the operation of the memory 110 may include, for example, a read operation, a program operation (also referred to as "write operation"), and an erase operation.

For example, the memory 110 may include various types of non-volatile memory such as a NAND flash memory, a 3D NAND flash memory, a NOR flash memory, a resistive random-access memory (RRAM), a Phase-Change Memory (PRAM), a magneto-resistive random-access memory (MRAM), a ferroelectric random-access memory (FRAM), or a spin transfer torque random access memory (STT-RAM) and the like.

The memory 110 may be implemented to have a three-dimensional array structure. The embodiments of the present disclosure can be applied not only to a flash memory in which a charge storage layer is composed of a conductive floating gate, but also to a charge trap type flash (CTF) in which the charge storage layer is composed of an insulation layer.

The memory 110 may receive commands and addresses from the controller 120 (also referred to as a memory controller) and may access an area in a memory cell array selected by an address. That is, the memory 110 may perform an operation indicated by a command with respect to the area selected by the address.

For example, the memory 110 may perform a program operation, a read operation, and an erase operation. During the program operation, the memory 110 may program data in the area selected by the address. During the read operation, the memory 110 may read data from the area selected by the address. During the erase operation, the memory 110 may erase data stored in the area selected by the address.

The controller 120 may control the program (write), read, erase, and background operations on the memory 110. Here, the background operation may include one or more of garbage collection (GC), wear leveling (WL), read reclaim (RR), or bad block management (BBM) operations.

The controller 120 may control the operation of the memory 110 in accordance with a request from an external device (e.g., a host HOST) located outside the storage device 100. Also, the controller 120 may control the operation of the memory 110 regardless of the request from the external device.

The external device may include a computer, an ultra-mobile PCs (UMPCs), a workstation, a personal digital assistant (PDAs), a tablet PC, a mobile phone, a smart phone, an e-book, a portable multimedia player (PMP), a portable game machine, a navigation system, a black box, a digital camera, a digital multimedia broadcasting (DMB) player, a smart television, a digital audio recorder, a digital audio player, a digital picture recorder, a digital picture player, a digital video recorder, a digital video player, a storage forming a data center, one of various electronic devices constituting a home network, one of various electronic devices constituting a computer network, one of various electronic devices constituting a telematics network, a radio frequency identification (RFID) device, or a mobile device (e.g., a vehicle, a robot, a drone) that travels on the ground, in the water or in the air under human control or autonomously.

The external device may include at least one operating system (OS). The operating system can manage and control overall functions and operations of the external device, and can provide mutual operations between the external device and the storage device 100. The operating system may be divided into a general operating system and a mobile operating system, depending on the mobility of external devices.

The controller 120 and the external device may be separated from each other. In some cases, the controller 120 and the external device may be implemented as one integrated device. Hereinafter, for convenience of description, an example will be described in which the controller 120 and the external device are separated from each other.

Referring to FIG. 1, the controller 120 may include a host interface 121, a memory interface 122, a control circuit 123, and the like.

The host interface 121 provides an interface for communicating with the external device. For example, the host interface 121 may provide an interface that uses at least one of various communication interfaces or protocols such as a universal serial bus (USB) protocol, a multimedia card (MMC) protocol, a peripheral component interconnection (PCI) protocol, a PCI-express (PCI-E) protocol, an advanced technology attachment (ATA) protocol, Serial-ATA protocol, a Parallel-ATA protocol, a small computer small interface (SCSI) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, a proprietary protocol, etc.

The control circuit 123 may receive a command through the host interface 121 and may perform an operation of processing the received command.

The memory interface 122 may be connected to the memory 110 to provide an interface for communicating with the memory 110. That is, the memory interface 122 may be configured to provide an interface between the memory 110 and the controller 120 in response to control of the control circuit 123.

The control circuit 123 may control the operation of the memory 110 by performing overall control operations of the controller 120. To this end, according to the embodiment, the control circuit 123 may include a processor 124, and additionally may selectively include a working memory 125 and/or an error detection and correction circuit (ECC) 126.

The processor 124 may control overall operations of the controller 120.

The processor 124 may communicate with the external device through the host interface 121 and may communicate with the memory 110 through the memory interface 122.

The processor 124 may perform a function of a flash translation layer (FTL). The processor 124 may convert a logical block address provided by the external device into a physical block address through the flash translation layer (FTL). Through use of a mapping table, the flash translation layer may receive a logical block address and may convert the logical block address into a physical block address.

There are various address mapping methods of the flash translation layer depending on a mapping unit. Representative address mapping methods include a page mapping method, a block mapping method, and a hybrid mapping method.

The processor 124 may randomize data received from the external device. For example, the processor 124 may randomize data received from the external device by using a set randomizing seed. The randomized data may be provided to the memory 110 and programmed into the memory 110.

The processor 124 may de-randomize the data received from the memory 110 during the read operation. For example, the processor 124 may de-randomize the data received from the memory 110 by using a de-randomizing seed. The de-randomized data may be output to the external device.

The processor 124 may perform background functions for the memory 110 such as a garbage collection (GC) function, a wear leveling (WL) function, and a bad block management function.

In order to secure a free space to which data is written when there is not enough space in which data is written in the memory 110, the garbage collection function may collect data partially written in an existing memory block and move the data to another memory block.

In order to prevent errors and data loss of the memory 110 in advance and to improve the durability and stability of a product, the wear leveling function prevents the excessive use of a specific block by evenly writing data to all memory blocks of the memory 110.

The bad block management function may detect a bad block within the memory 110 and replace the bad block with a spare block when there is the spare block, so that data is prevented from being written to the bad block.

The processor 124 may control the operation of the controller 120 by executing firmware. The processor 124 may control overall operations of the controller 120 and may execute (drive) firmware stored in the working memory 125 during booting. Hereinafter, the operation of the storage device 100 described in the embodiments of the present disclosure may be implemented in such a manner that the processor 124 executes firmware in which corresponding operations are defined.

The firmware is a program which is executed in the storage device 100 in order to drive the storage device 100 and may include various functional layers. For example, the firmware may include binary data in which codes for executing each of the aforementioned functional layers are defined.

For example, the firmware includes the flash translation layer, a host interface layer (HIL), and a flash interface layer (FIL). The flash translation layer performs a translation function between the logical block address transmitted from the external device to the storage device 100 and the physical block address of the memory 110. The host interface layer interprets the command received from the external device through the host interface 121 and transmits it to the flash translation layer. The flash interface layer transmits the command instructed by the flash translation layer to the memory 110.

Also, the firmware may include the garbage collection function, the wear leveling function, and the bad block management function.

Such firmware may be, for example, loaded into the working memory 125 from the memory 110 or a separate non-volatile memory (e.g., ROM, NOR Flash) located outside the memory 110. When executing booting after power-on, the processor 124 may first load all or part of the firmware into the working memory 125.

The processor 124 may perform a logic operation defined in the firmware loaded into the working memory 125 in order to control the overall operation of the controller 120. The processor 124 may store a result of performing the logic operation defined in the firmware in the working memory 125. The processor 124 may control the controller 120 to generate a command or signal in accordance with the result of performing the logic operation defined in the firmware. When the part of the firmware in which the logic operation to be performed is defined is not loaded into the working memory 125, the processor 124 may generate an event (e.g., interrupt) for loading the corresponding part of the firmware into the working memory 125.

Meanwhile, the processor 124 may load, from the memory 110, meta data required to drive the firmware. The meta data is for managing the memory 110 and may include management information on user data stored in the memory 110.

The firmware may be updated while the storage device 100 is being produced or while the storage device 100 is running. The controller 120 may download new firmware from the outside of the storage device 100 and may update the existing firmware to the new firmware.

The working memory 125 may store firmware, program codes, commands, or data required to drive the controller 120. The working memory 125 may include, for example, a volatile memory such as one or more of a static RAM (SRAM), a dynamic RAM (DRAM), and a synchronous DRAM (SDRAM).

The error detection and correction circuit 126 may detect an error bit of a target data by using an error correction code and may correct the detected error bit. Here, the target data may be, for example, data stored in the working memory 125 or data read from the memory 110.

The error detection and correction circuit 126 may be implemented to decode data with the error correction code. The error detection and correction circuit 126 may be implemented with a variety of decoders. For example, a decoder that performs non-systematic decoding or a decoder that performs systematic decoding may be used.

For example, the error detection and correction circuit 126 may detect an error bit in units of sectors set for each read data. That is, each read data may be composed of a plurality of sectors. The sector may refer to a data unit less than a page that is a read unit of a flash memory. The sectors constituting each read data may correspond to each other through the medium of an address.

The error detection and correction circuit 126 may calculate a bit error rate (BER) and may determine whether correction is possible in units of a sectors. For example, the error detection and correction circuit 126 may determine that a corresponding sector is uncorrectable or a fail when the bit error rate (BER) is higher than a preset reference value. On the other hand, if the bit error rate (BER) is lower than the reference value, the error detection and correction circuit 126 may determine that the corresponding sector is correctable or a pass.

The error detection and correction circuit 126 may sequentially perform error detection and correction operation on all read data. When the sector included in the read data is correctable, the error detection and correction circuit 126 may omit the error detection and correction operation on the corresponding sector in the next read data. When the error detection and correction operations on all read data are completed in this way, the error detection and correction circuit 126 may detect sectors that are determined to be uncorrectable until the end of the data. There may be one or more sectors determined to be uncorrectable. The error detection and correction circuit 126 may transmit information (e.g., address information) on the sector determined to be uncorrectable to the processor 124.

A bus 127 may be configured to provide a channel between the components 121, 122, 124, 125, and 126 of the controller 120. Such a bus 127 may include, for example, a control bus for transmitting various control signals, commands, and the like, and a data bus for transmitting various data.

Further, some of the aforementioned components 121, 122, 124, 125, and 126 of the controller 120 may be removed, or some of the aforementioned components 121, 122, 124, 125, and 126 of the controller 120 may be integrated into one. In some cases, in addition to the above-described components of the controller 120, one or more other components may be added.

Figure 2:
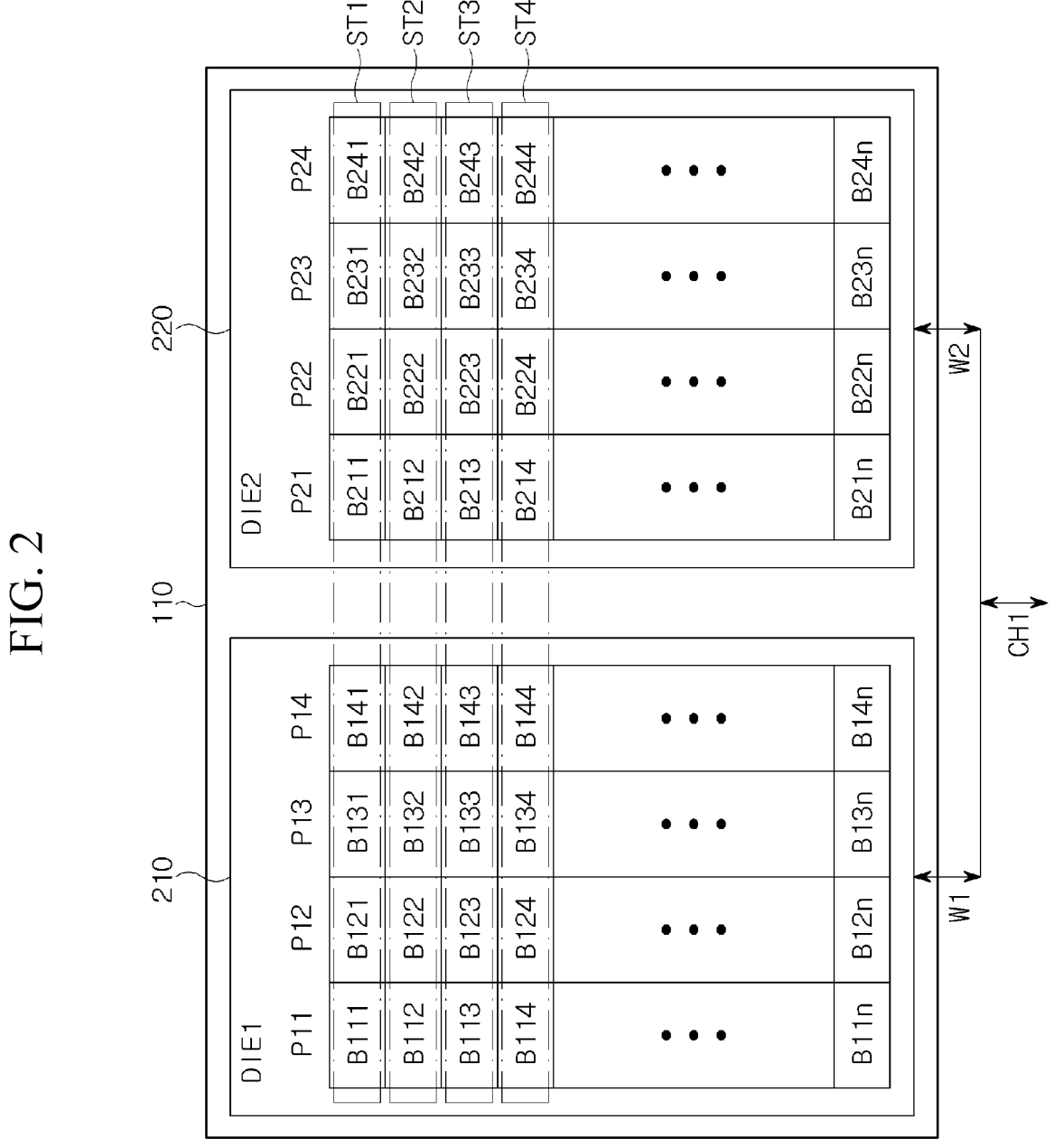
FIG. 2 shows schematically a configuration of a memory according to various embodiments of the present disclosure.

FIG. 2 shows schematically a configuration of the memory 110 according to various embodiments of the present disclosure.

The memory 110 may include a plurality of dies 210 and 220. An embodiment of FIG. 2 shows that the memory 100 includes two dies, but is not limited thereto, and may include three or more dies. In addition, each of the plurality of dies 210 and 220 may include a plurality of planes P11, P12, P13, P14, P21, P22, P23, and P24. The plurality of planes P11, P12, P13, P14, P21, P22, P23, and P24 may include a plurality of memory blocks B111 to B11$n$, B121 to B12$n$, B131 to B13$n$, B141 to B14$n$, B211 to B21$n$, and B221 to B22$n$, B231 to B23$n$, and B241 to B24$n$, respectively. Each of the memory blocks may include a plurality of pages.

In addition, a stripe is defined. The stripes ST1, ST2, ST3, and ST4 can be called a set of the memory blocks having the same relative physical block address in the planes of the plurality of dies 210 and 220 included in the memory 110 (or a set of message blocks having the relative page address). In the example of FIG. 2, the stripe ST1 is defined as a set of memory blocks B111, B121, B131, B141, B211, B221, B231, and B241, but may be defined as a set of pages according to another embodiment. Here, the memory blocks B111, B121, B131, B141, B211, B221, B231, and B241 may have a relative physical block address of 0 in the planes P11, P12, P13, P14, P21, P22, P23, and P24, respectively. Alternatively, the stripe ST1 may have pages having a relative page address of 0 in the planes P11, P12, P13, P14, P21, P22, P23, and P24.

The plurality of dies constituting the memory 110 may be connected to the controller 120 through at least one channel CH1. For example, the first die 210 may be connected to the controller 120 through a first channel CH1, and the second die 220 may be connected to the controller 120 through a second channel CH2. Accordingly, the memory interface 122 of the controller 120 may include a plurality of channel interfaces, and each of the plurality of channels CH1 and CH2 may be connected to one of the plurality of channel interfaces.

The controller 120 and the memory 110 may be connected through a plurality of data paths. Referring to FIG. 2, the plurality of dies 210 and 220 included in the memory 110 may be connected to the controller 120 through different paths. According to the embodiment, the first die 210 may be connected to the controller 120 through the first channel CH1 and a first way W1, and the second die 220 may be connected to the controller 120 through the first channel CH1 and a second way W2. Although not shown in FIG. 2, if there are additional dies, these dies may be connected to the controller 120 through different channels and ways (e.g., the first channel and a third way, or the second channel and the first way). That is, the number of channels and ways that constitute the data path between the controller 120 and the memory 110 may change depending on the number of dies included in the memory 110.

The plurality of dies 210 and 220 within the memory 110 can be understood as different modules, and are connected to the controller 120 through different data paths to exchange data through interleaving, thereby increasing a data transmission speed.

Although it has been described above that the memory 110 is composed of the plurality of dies 210 and 220, each of the plurality of dies 210 and 220 may be separately packaged to form one memory. Accordingly, while the memory 110 may be one memory having the plurality of dies 210 and 220 therein, the memory 110 may include a plurality of memory devices according to another embodiment. Hereinafter, the following description is based on one memory having the plurality of dies 210 and 220 provided therein. However, it is possible to consider that the plurality of dies 210 and 220 is equated to a plurality of memories.

As such, the data transmission speed between the controller 120 and the memory 110 can be increased in terms of an overall system by using the plurality of channels, the plurality of ways W1 and W2, and the plurality of planes. In this structure, when the storage device is a multiple function NVME device (MFND) capable of supporting a plurality of physical functions (PFs), there may be a requirement for an operation method of the storage device for maximizing a read performance for each PF.

Figure 3:
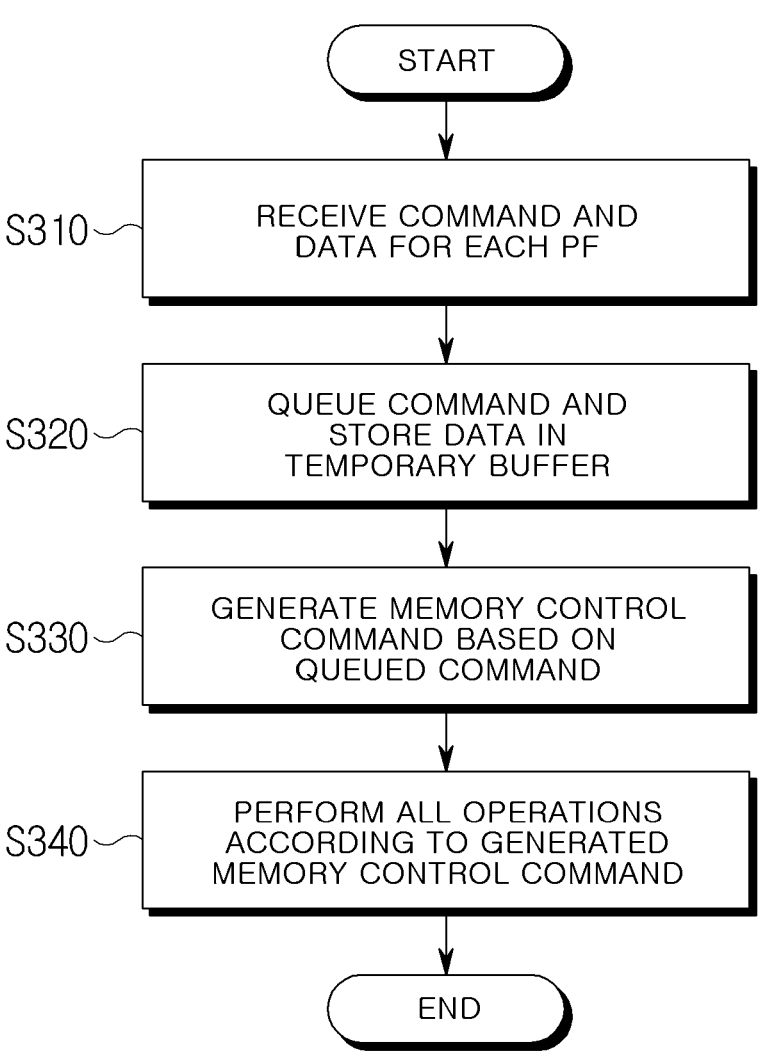
FIG. 3 is a flowchart for describing an operation method of the storage device according to various embodiments of the present disclosure.

FIG. 3 is a flowchart for describing the operation method of the storage device according to various embodiments of the present disclosure.

Referring to FIG. 3, in operation S310, the storage device 100 may receive a command from an external device 150. According to the embodiment, when the command is a program command, write data corresponding to the program command may be further received.

According to the embodiment, when there is a plurality of external devices 150 or when only one external device 150 supports plural PFs, the command received by the storage device 100 may be distinguished for each of the PFs.

In operation S320, the storage device 100 may classify the received commands and queue them in a command queue on the basis of various priorities.

In operation S320, with respect to the received program command, the storage device 100 may determine whether the corresponding program command is for programming continuous data.

Here, the continuous data corresponds to data whose logical addresses for writing are consecutive and whose size is equal to or greater than the size of the stripe shown in FIG. 2. On the other hand, discontinuous data may have a size less than the size of the stripe shown in FIG. 2. According to the embodiment, the size of the stripe may be a value obtained through multiplication of the number of dies included in the memory 110, the number of planes for each die, and the size of the page. Here, the page may be a minimum unit that is used to read and write data from and to the memory 110. In the example of FIG. 2, the size of the stripe may be 32 Kbytes obtained through 2 (the number of dies)×4 (the number of planes for each die)×4 Kbytes (the size of the page).

If the write data of the program command corresponds to the continuous data, the storage device may determine that the corresponding program command is a continuous program command, and may store a continuous data parameter representing the corresponding program command together with a program command queued in the command queue in correspondence with the program command queued in the command queue. If the write data of the program command corresponds to discontinuous data, the storage device may determine that the corresponding program command is a discontinuous program command. The above-described determination of the continuous program command may be made in operation S320, but may also be performed in other subsequent operations.

In operation S330, the storage device 100 may generate a memory control command based on the queued command, and in operation S340, the storage device 100 may perform an operation according to the generated memory control command.

According to the embodiment, in operation S330, the storage device 100 may generate at least one memory control command capable of controlling the operation of the memory 110 on the basis of the queued command. The generated at least one memory control command is transmitted to the memory 110 through the memory interface 122, and the memory 110 performs operations (e.g., a read operation or a program operation) in accordance with the received at least one memory control command.

Figure 4A:
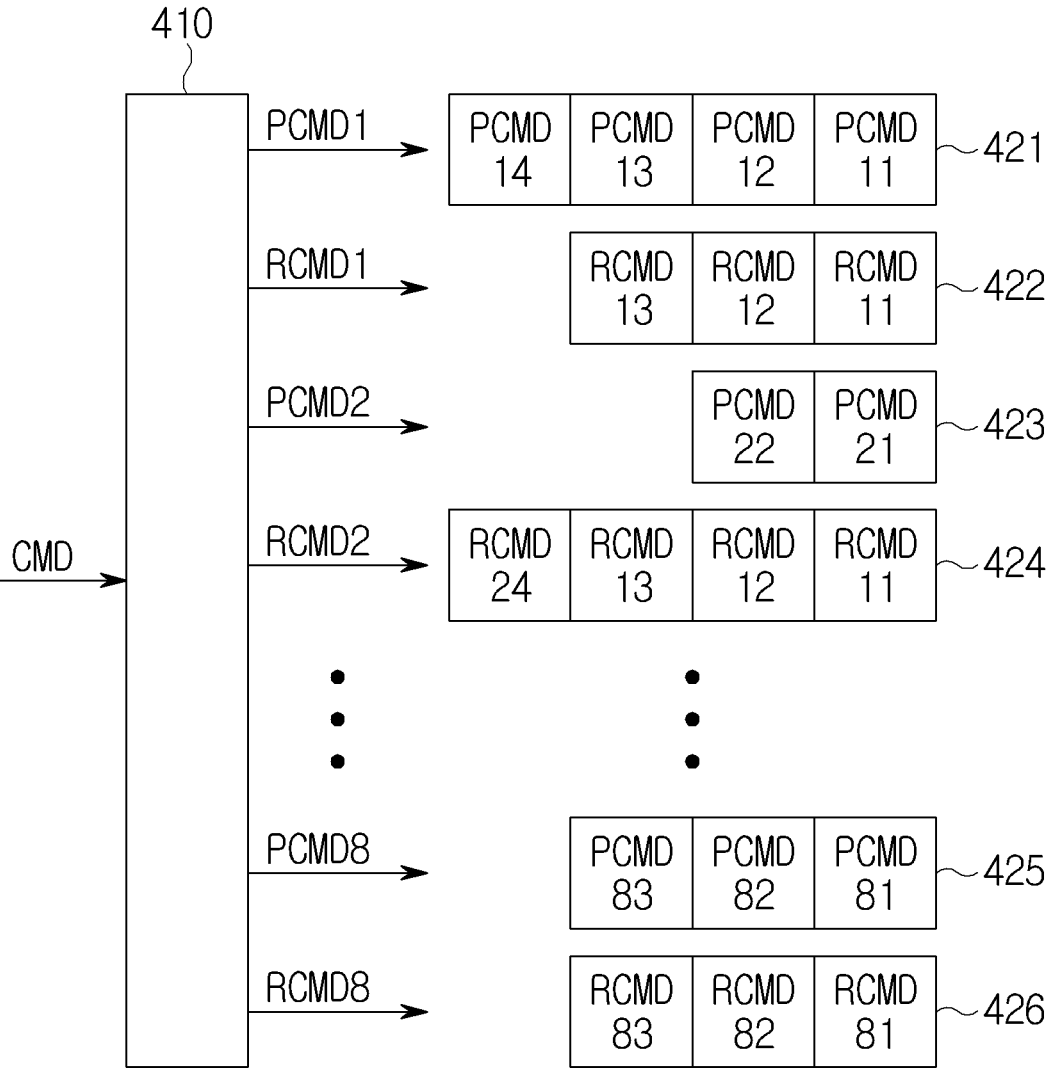
FIGS. 4A and 4B show examples in which the storage device 100 queues commands in accordance with various embodiments of the present disclosure.
Figure 4B:
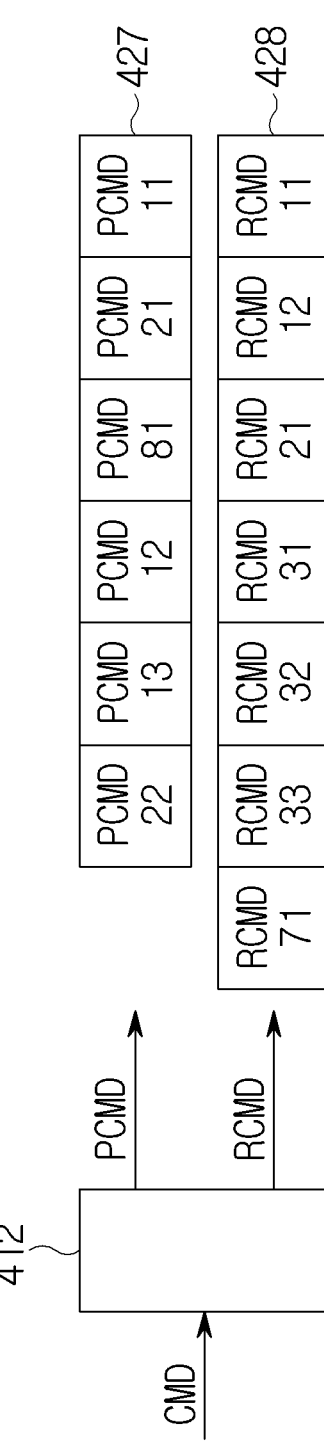

FIGS. 4A and 4B show examples in which the storage device 100 queues commands in accordance with various embodiments of the present disclosure. FIGS. 4A and 4B may show an embodiment of operation S320 of FIG. 3, but the embodiment of operation S320 in which the command is queued is not limited thereto.

FIG. 4A shows a first embodiment in which a command classifier 410 of the storage device 100 classifies the received commands by PFs and classifies the received commands according to whether the received commands are program commands or read commands, and queues the commands in a program command queue or a read command queue for each PF. According to the embodiment, the command classifier 410 may be one functional module that is driven by the processor 124.

Referring to FIG. 4A, the command classifier 410 may determine the PF to which the corresponding command belongs and whether the corresponding command is the program command PCMD or the read command RCMD with reference to a header of the received command CMD, etc., and may queue the corresponding command in a corresponding command queue on the basis of the determination result. For example, if the received command CMD is a program command for PF #1, the command classifier 410 may queue the corresponding command to the end of a command queue 421 for PF #1 among command queues 421 to 426 for respective PFs. In the case of the first embodiment, when an instruction to write data to consecutive addresses is received by using a plurality of commands, these commands can be merged and executed, so that performance can be further improved.

The example of FIG. 4A shows that the storage device 100 includes separate command queues for each PF and for each program/read. However, according to another embodiment, one command queue may be provided for each PF and a command for the corresponding PF may be queued in the command queue according to a priority when received.

According to further another embodiment, although not shown in the example of FIG. 4A, reception time information of each command may be additionally stored. This assigns a priority according to a reception time later.

FIG. 4B shows a second embodiment in which the command classifier 412 of the storage device 100 divides the received commands into program commands and read commands, and queues them. According to the embodiment, the command classifier 412 may be one functional module that is driven by the processor 124.

The embodiment of FIG. 4B is different from the embodiment of FIG. 4A, and shows an example in which the command classifier only classifies the received commands into program commands PCMD and read commands RCMD without classifying the received commands by PFs, and queues the commands in command queues 427 and 428 in the order received. In the case of FIG. 4B, it may not be necessary to store the reception time information that may be additionally requested in FIG. 4A.

Here, data received together with the program command may be stored in a temporary buffer. The temporary buffer may use a portion of the working memory 125.

In general, since the read command has a higher priority than that of the program command, the read command can be processed before the program command. Also, since the generation of the memory control command according to the read command is already well known, detailed descriptions thereof will be omitted in the present disclosure.

However, in order to improve efficiency when reading the continuous data, the continuous data needs to be written over the plurality of dies included in the memory 110. Accordingly, here, a method of determining data to be stored in the planes of each die of the memory 110 in order for the storage device 100 to write the continuous data over the plurality of dies included in the memory 110 will be described.

Figure 5:
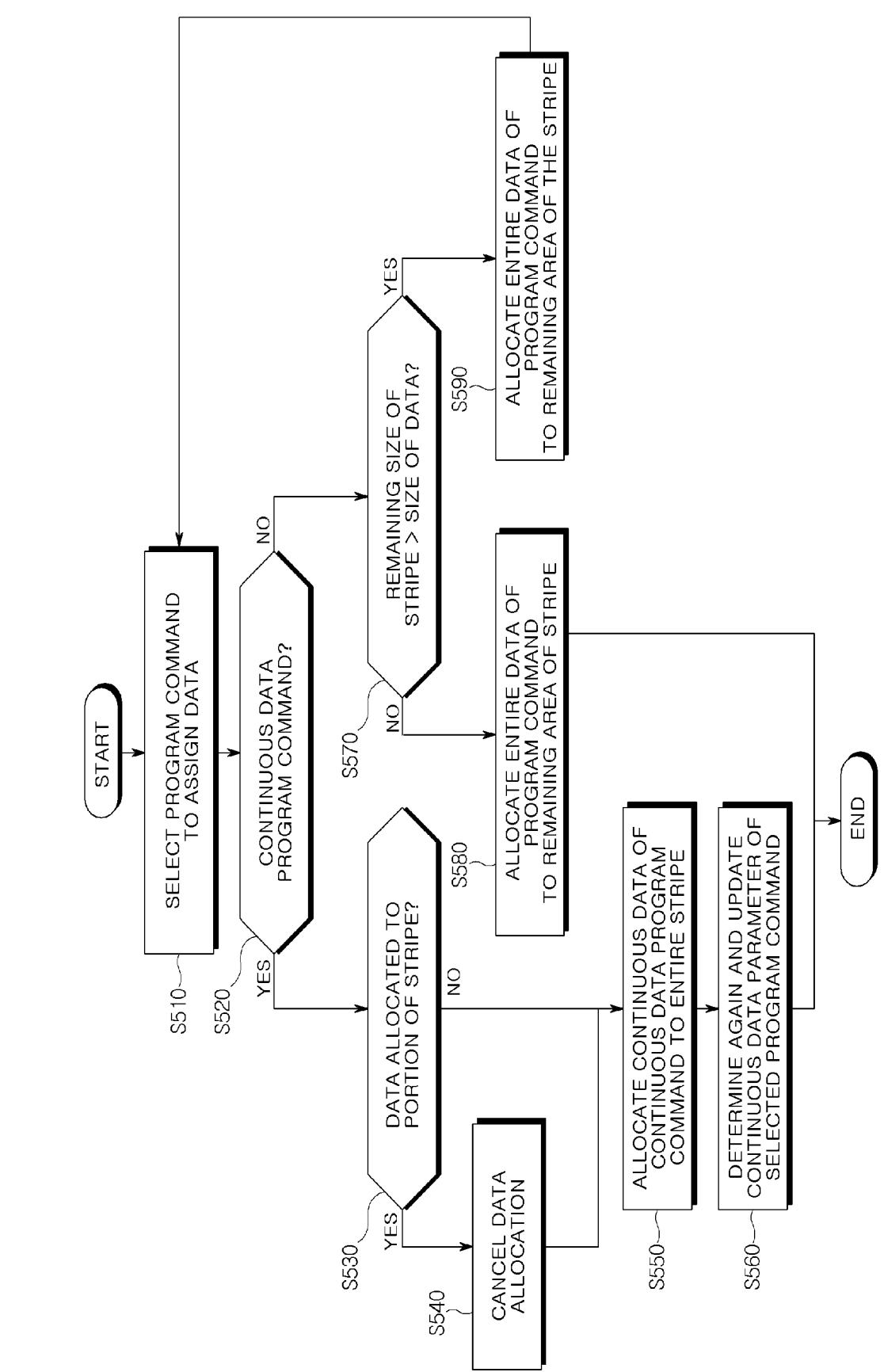
FIG. 5 is a flowchart showing a method for determining data to be stored in planes of each die of the memory in accordance with various embodiments of the present disclosure.

FIG. 5 is a flowchart showing a method for determining data to be stored in the planes of each die of the memory in accordance with various embodiments of the present disclosure.

Referring to FIG. 5, in operation S510, the storage device 100 may select a program command. According to the embodiment, the storage device 100 may select a program command having the highest priority on the basis of priority.

According to the embodiment, in the first embodiment of FIG. 4A, an earliest program command corresponding to the earliest reception time among the program commands queued at the foremost positions in the respective program command queues 421, 423, and 425 for respective PFs may be selected as a program command having the highest priority. According to another embodiment, a program command which is the continuous program command among the program commands queued at the foremost positions in the respective program command queues 421, 423, and 425 for the respective PFs may be selected as a program command having the highest priority. According to further another embodiment, an earliest program command which is the continuous program command may be selected as a program command having the highest priority.

According to another embodiment, in the case of the second embodiment of FIG. 4B, a program command queued at the foremost position in the program command queue 427 may be selected as a program command having the highest priority.

In operation S520, the storage device 100 determines whether the selected program command is the continuous program command.

If the storage device 100 determines that the selected program command is the continuous program command in operation S520, the storage device 100 may determine in operation S530 whether data has already been allocated to a portion of the stripe to which write data of the continuous program command is to be currently allocated. This may mean that data has been allocated in advance by a program command having a higher priority than that of the currently selected program command.

If the storage device 100 determines in operation S530 that data has already been allocated to a portion of the stripe to which the write data of the continuous program command is to be currently allocated, the storage device 100 may cancel the data allocation in operation S540. This operation has the effect of giving an additional priority such that the continuous data can be allocated to the entire stripe.

When the storage device 100 determines in operation S530 that there is no data allocated in advance to the stripe to which the write data of the continuous program command is to be currently allocated or after the storage device 100 cancels the data allocation in operation S540, the storage device 100 may allocate in operation S550 a portion of the write data of the selected continuous program command to the entire stripe. Then, in operation S560, the storage device 100 may subtract the size of the stripe from the size of the write data of the selected continuous program command. and then, the storage device 100 may determine again whether the write data remained after the allocation is the continuous data and update the continuous data parameter of the selected continuous program command. Even though, before the allocation, the write data of the selected program command is a continuous data and the allocation of the write data to the stripe is performed as the continuous program command, the selected program command is no longer the continuous program command if the size of the remained write data is less than the size of the stripe, and therefore, the continuous data parameter of the selected program command may be reset.

When the storage device 100 determines in operation S520 that the selected program command is the discontinuous program command, the storage device 100 may determine in operation S570 whether the remaining size of the stripe (i.e., a size of an empty part within the stripe) obtained by subtracting the size of the already allocated data from the size of the stripe is greater than the size of the write data of the selected discontinuous program command.

As a result of the determination in operation S570, if the remaining size of the stripe is less than or equal to the size of the write data of the selected discontinuous program command, the storage device 100 may allocate the write data of the selected discontinuous program command to the remaining area of the stripe.

As a result of the determination in operation S570, if the remaining size of the stripe is greater than the size of the write data of the selected discontinuous program command, the storage device 100 may allocate, in operation S590, the entire write data of the selected discontinuous program command to a portion of the remaining area of the stripe.

Since a portion of the stripe remains unallocated even after the allocation in operation S590, the storage device 100 may perform operation S510 again and may select an additional program command to allocate data and perform an operation of allocating data.

The continuous data may be written by the above-described operation of FIG. 5 to the stripe that is throughout the entire die included in the memory 110.

FIGS. 6A to 6D are views showing an example in which a data arrangement operation of FIG. 5 is performed.

In FIGS. 6A to 6D, PCMD1 to PCMD7 indicate indexes of the program command, and each program command may belong to any PF. That is, PCMD1 to PCMD7 may all belong to different PFs or may all belong to the same PF. However, logical addresses to be written by each command are not consecutive. According to the embodiment, PCMD1 to PCMD7 may be merged commands. For example, if the storage device receives two program commands from the same PF and the two program commands request data write to the consecutive logical addresses, the storage device may generate one PCMD by merging the two program commands. The storage device 100 may additionally perform such a merge operation in operation S320 of FIG. 3, thereby queueing the merged command in the command queue.

Also, tables 610, 620, 630, and 640 shown in FIGS. 6A to 6D show program commands listed in the order in which they are selected based on priority.

FIG. 6A is a view for describing an operation of allocating data to the stripe ST1.

Referring to FIG. 6A, according to operation S510 of FIG. 5, the storage device 100 may select the program command PCMD1. The program command PCMD1 is not for programming continuous data and the storage device 100 may determine that the size (2) of the data of the program command PCMD1 is less than the remaining size (8) of the stripe ST1, and then may allocate the data of the program command PCMD1 to the remaining areas (e.g., B111 and B211 of FIG. 2) of the stripe ST1 in accordance with operation S590. Here, according to the embodiment, the area selection within the stripe ST1 may be made in an interleaving manner. That is, data may be allocated by alternately selecting the memory blocks included in each die within the stripe ST1. Accordingly, when reading data according to the read command, a read speed can be increased.

The storage device 100 may select again the program command PCMD2 according to operation S510. The program command PCMD2 is not for programming continuous data and the storage device 100 may determine that and the size (4) of the data of the program command PCMD2 is less than the remaining size (6) of the stripe ST1, and then may allocate the data of the program command PCMD2 to the remaining areas (e.g., B121, B221, B131, and B231 of FIG. 2) of the stripe ST1 in accordance with operation S590.

The storage device 100 may select again the program command PCMD3 according to operation S510. Since the program command PCMD3 is not a continuous program command and the size (7) of the write data of the program command PCMD3 is greater than the remaining size (2) of the stripe ST1, the storage device 100 may allocate a portion of the write data of the program command PCMD3 to the remaining areas (e.g., B141 and B241 of FIG. 2) of the stripe ST1 in accordance with operation S580. Here, after the allocation, the size of the write data of the program command PCMD3 may be reduced by the size of the allocated portion thereof, as illustrated in table 620.

Accordingly, the data allocation to the stripe ST1 can be completed, and the program commands PCMD1 and PCMD2 where the data allocation has been completed may be removed from the command queue.

FIG. 6B is a view for describing an operation of allocating data to the stripe ST2.

Referring to FIG. 6B, according to operation S510 of FIG. 5, the storage device 100 may select the program command PCMD3. The program command PCMD3 is not for programming continuous data and the storage device 100 may determine that the size (5) of the data of the program command PCMD3 is less than the remaining size (8) of the stripe ST2, and then may allocate the data of the program command PCMD3 to the remaining areas (e.g., B112, B212, B122, B222 and B132 of FIG. 2) of the stripe ST2 in accordance with operation S590.

The storage device 100 may select again the program command PCMD4 according to operation S510. Since the program command PCMD4 is for programming continuous data and a portion of the stripe ST2 has already been allocated in advance to another program command PCMD3, the storage device may cancel the already allocated data according to operation S540 and then may allocate the continuous data to the entire stripe ST2 according to operation S550. Accordingly, only the data of the program command PCMD4 is allocated to the stripe ST2. Then, in operation S560, the size of the data of the program command PCMD4 is changed to 10, and the storage device may determine again whether the data is the continuous data on the basis of the value of 10. As a result of the determination, the size of the data is still greater than the size of the stripe, the data can be determined as the continuous data.

The previous allocation of the program command PCMD3 may be canceled so that the size of data can be maintained as it is.

Accordingly, the data allocation to the stripe ST2 can be completed, and there is no program command where the data allocation has been completed. Therefore, there is no program command that has been removed in the command queue.

FIG. 6C is a view for describing an operation of allocating data to the stripe ST3.

The operation of allocating data to the stripe ST3 of FIG. 6C may be the same as the operation of allocating data to the stripe ST2 of FIG. 6B.

Referring to FIG. 6C, according to operation S510 of FIG. 5, the storage device 100 may select the program command PCMD3. The program command PCMD3 is not for programming continuous data and the storage device 100 may determine that the size (5) of the data of the program command PCMD3 is less than the remaining size (8) of the stripe ST3, and then may allocate the data of the program command PCMD3 to the remaining areas (e.g., B113, B213, B123, B223, and B133 of FIG. 2) of the stripe ST3 in accordance with operation S590.

The storage device 100 may select the program command PCMD4 again according to operation S510. Since the program command PCMD4 is for programming continuous data and a portion of the stripe ST3 has already been allocated in advance to another program command PCMD3, the storage device may cancel the already allocated data according to operation S540 and then may allocate the continuous data to the entire stripe ST3 according to operation S550. Accordingly, only the data of the program command PCMD4 is allocated to the stripe ST3. Then, in operation S560, the size of the data of the program command PCMD4 is changed to 2, and the storage device may determine again whether the data is the continuous data on the basis of the value of 2. As a result of the determination, the size of the data of the program command PCMD4 is less than the size of the stripe, so that the data may be determined as not being the continuous data. The previous allocation of the program command PCMD3 may be canceled so that the size of data can be maintained as it is.

Accordingly, the data allocation to the stripe ST3 can be completed, and there is no program command where the data allocation has been completed. Therefore, there is no program command that has been removed in the command queue.

FIG. 6D is a view for describing an operation of allocating data to the stripe ST4.

Referring to FIG. 6D, according to operation S510 of FIG. 5, the storage device 100 may select the program command PCMD3. The program command PCMD3 is not for programming continuous data and the storage device 100 may determine that the size (5) of the data of the program command PCMD3 is less than the remaining size (8) of the stripe ST3, and then may allocate the data of the program command PCMD3 to the remaining areas (e.g., B114, B214, B124, B224, and B134 of FIG. 2) of the stripe ST4 in accordance with operation S590.

The storage device 100 may select again the program command PCMD4 according to operation S510. The program command PCMD4 is no longer for programming continuous data and the storage device may determine that the size (2) of the data of the program command PCMD4 is less than the remaining size (3) of the stripe ST4, and then may allocate the remaining data of the program command PCMD4 to the remaining areas (e.g., B234 and B244 of FIG. 2) of the stripe ST4.

The storage device 100 may select the program command PCMD5 again according to operation S510. The program command PCMD5 is not continuous program command and the size (3) of the write data of the program command PCMD5 is greater than the remaining size (1) of the stripe ST4. Then, the storage device 100 may allocate a portion of the write data of the program command PCMD5 to the remaining areas (e.g., B244 of FIG. 2) of the stripe ST4 in accordance with operation S580. Here, after the allocation, the size of the write data of the program command PCMD5 may be reduced by the size of the allocated portion thereof, as illustrated in table 650.

Accordingly, the data allocation to the stripe ST4 can be completed, and the program commands PCMD3 and PCMD4 where the data allocation has been completed may be removed the command queue.

Referring to the description of FIGS. 6A to 6D, according to the method proposed in FIG. 5, with respect to the continuous data whose size of data stored in consecutive addresses is greater than the size of the data of the stripe, the data is written to the entire stripe. Accordingly, when reading according to the read command, the read speed can be increased.

In the method of FIG. 5, as mentioned in the description of FIGS. 6B and 6C, the time at which the write data of the discontinuous program command PCMD3 having a high priority is written may be delayed because of the continuous program command PCMD4. In some cases, when there are many continuous program commands, there is a possibility that the writing of the discontinuous data may be delayed for a substantial amount of time. In order to solve this problem, a timeout period may be provided for each program command. If the writing of the discontinuous data is not completed within the timeout period after receiving the program command for the discontinuous data, the corresponding program command for the discontinuous data may have the highest priority. Thus, the discontinuous data of the corresponding program command is programmed first even before continuous data.

FIG. 7 is a flowchart showing a method for determining data to be stored a plane of each die of the memory while processing a time out program command with the highest priority in accordance with various embodiments of the present disclosure.

The operation of FIG. 7 is almost the same as that of FIG. 5, and further includes an operation S545 of determining whether the allocated data is a timeout data and an operation S547 of subsequently selecting a new program command if the allocated data is a timeout data. Here, the timeout data corresponds to a discontinuous data having the highest priority because the writing of the discontinuous data is not completed within the timeout period. The method according to the flowchart of FIG. 7 is an embodiment, and other methods may give the highest priority to the data allocation on the basis of the timeout.

Referring to FIG. 7, in operation S510, the storage device 100 may select a program command to allocate data of the selected program command. According to the embodiment, the storage device 100 may select a program command having the highest priority on the basis of priority. Detailed operations here may be the same as those of operation S510 of FIG. 5.

In operation S520, the storage device 100 determines whether the selected program command is the continuous program command.

If the storage device 100 determines that the selected program command is the continuous program command in operation S520, the storage device 100 may determine in operation S530 whether data has already been allocated to a portion of the stripe to which write data of the continuous program command is to be currently allocated. This may mean that data has been allocated in advance by a program command having a higher priority than that of the currently selected program command.

If the storage device 100 determines in operation S530 that data has already been allocated to a portion of the stripe to which the write data of the continuous program command is to be currently allocated, the storage device 100 may determine in operation S545 whether the allocated data is a timeout data.

If the storage device 100 determines in operation S545 that the allocated data is the timeout data, the storage device 100 may select in operation S547 another discontinuous program command from among the discontinuous program commands in the program command queue. Accordingly, in this case, priority is not given to the continuous data, and the timeout data may be allocated to the stripe with the highest priority.

If the storage device 100 determines in operation S545 that the allocated data is not the timeout data, the storage device 100 may cancel the data allocation in operation S540. Subsequent operations are the same as those described in FIG. 5 and may be performed the same, so that further description thereof will be omitted.

The discontinuous data that has not been programmed yet even after the lapse of a predetermined timeout period may be programmed with the highest priority by the above-described operations S545 and S547 of FIG. 7, so that it is possible to minimize the actual timeout risk of the program command.

FIG. 8 is a view showing an example in which a data arrangement operation of FIG. 7 is performed.

In FIG. 8, only the changed portions will be described by using the examples of FIGS. 6A to 6D as they are.

In FIGS. 6A and 6B, there is no timeout discontinuous data. In this case, the data arrangement operation of FIG. 7 is the same as the data arrangement operation of FIG. 5, and thus, this results in the same data arrangement in the stripes ST1 and ST2.

FIG. 8 is a view for describing an operation of allocating data to the stripe ST3 when the discontinuous program command PCMD3 is in a timeout state in FIG. 6C.

Referring to FIG. 8, according to operation S510 of FIG. 7, the storage device 100 may select the program command PCMD3. The program command PCMD3 is not for programming continuous data and the storage device 100 may determine that the size (5) of the data of the program command PCMD3 is less than the remaining size (8) of the stripe ST3, and then may allocate the data of the program command PCMD3 to the remaining areas (e.g., B113, B213, B123, B223, and B133 of FIG. 2) of the stripe ST3 in accordance with operation S590.

The storage device 100 may select the program command PCMD4 again according to operation S510. The program command PCMD4 is for programming continuous data. However, since the program command PCMD3 with data which has already been allocated to a portion of the stripe ST3 is in a timeout state, the storage device 100 may select again in operation S547 a program command from among the discontinuous program commands in the program command queue without allocating the data of the continuous program command PCMD4.

Referring to the command selection sequence 630 according to the priority of FIG. 8, the storage device 100 may select the program command PCMD5. The program command PCMD5 is not for programming continuous data and the storage device 100 and the storage device 100 may determine that the size (3) of the data of the program command PCMD5 is equal to the remaining size (3) of the stripe ST3, and then may allocate the data of the program command PCMD5 to the remaining areas (e.g., B143, B233, and B243 of FIG. 2) of the stripe ST3 in accordance with operation S580.

Accordingly, the data allocation to the stripe ST3 can be completed, and the program commands PCMD3 and PCMD5 where the data allocation has been completed may be removed the command queue.

The data allocation result in the stripe obtained according to FIG. 5 or FIG. 7 described above can be seen as a mapping result of the logical address seen by the external device 150 having the flash translation layer and a physical address of the memory 110, and mapping information according to the corresponding result may be stored in a mapping table.

Referring back to FIG. 3, when the data allocation to each stripe is finally completed, the data allocated to the corresponding stripe of the memory 110 can be written in operation S330.

Referring to the description of FIG. 8, it can be understood that the data of the timeout program command PCMD3 is discontinuous, but can be written earlier than the continuous data. Therefore, the predetermined timeout period within the storage device 100 is set to be less than a timeout period required by the external device 150, and then the data allocation according to FIG. 7 is performed. As a result, it is possible to reduce a risk that the external device 150 actually times out.

In the present disclosure, for the purpose of improving the read performance, a method for writing continuous data to the stripe of the memory 110 at once and a method for writing the timeout discontinuous data first are suggested. Accordingly, the performance of the storage device 100 and the efficiency seen by the external device can be improved.

According to various embodiments of the present disclosure, data that is written to consecutive addresses is distributed and stored in a plurality of dies, thereby maximizing the read performance.

According to various embodiments of the present disclosure, it is possible to reduce the risk of command timeout while maximizing the read performance by programming the writing of the continuous data and discontinuous data in the form of FIFO. Furthermore, the embodiments may be combined to form additional embodiments.

What is claimed is:

1. An operation method of a memory controller, the operation method comprising:

receiving, from at least one external device, program commands and corresponding write data;

sequentially storing the program commands in a command queue in an order, in which the program commands are received, and storing the write data in a temporary buffer;

selecting a program command from among the program commands stored in the command queue;

determining whether the selected program command is a continuous program command or a discontinuous program command; and allocating, if the selected program command is the continuous program command, the write data of the selected program command to an entire area of a stripe that is a memory area formed over a plurality of dies included in a memory device, wherein the determining comprises determining that the selected program command is the continuous program command when logical addresses for writing the write data of the selected program command are consecutive and a size of the write data of the selected program command is greater than or equal to a size of the stripe, and wherein the allocating comprises:

receiving a continuous program command allocated to the entire area of the stripe while discontinuous data has already been allocated to a portion of a stripe, canceling the allocation of the discontinuous data;

allocating a continuous data of the continuous program command to the entire area of the stripe;

subtracting a continuous data parameter indicating a data size of the selected program command by the size of the stripe; and determining again whether the selected program command is the continuous program command.

2. The operation method of claim 1, wherein the size of the stripe is determined by multiplying a number of the dies, a number of planes included in each of the dies and a size of a page.

3. The operation method of claim 1, wherein the storing comprises storing the program commands for each physical function (PF) in the command queue corresponding to each PF.

4. The operation method of claim 3, wherein the storing comprises merging, when logical addresses for writing the write data of the program commands for one PF are consecutive, the program commands for the one PF into one program command and storing the merged program command in the command queue corresponding to the one PF.

5. The operation method of claim 3, wherein the selecting comprises selecting a continuous program command from among the program commands at a foremost position in the command queue for each PF.

6. The operation method of claim 3, wherein the selecting comprises selecting a program command having an earliest reception time from among the program commands at a foremost position in the command queue for each PF.

7. The operation method of claim 1, wherein the selecting comprises selecting a program command at a foremost position in the command queue.

8. The operation method of claim 1, wherein the allocating comprises:

canceling, when write data of a previously selected program command has already been allocated to a portion of the stripe and the allocated data is a timeout data whose predetermined timeout period has lapsed, allocating the write data of the selected program command to the entire area of the stripe; and selecting one discontinuous program command from among the program commands stored in the command queue in order to allocate, to an empty portion within the stripe, write data of the selected discontinuous program command.

9. The operation method of claim 1, wherein the allocating comprises updating, when only a portion of the write data of the continuous program command is allocated to the entire area of the stripe, the size of the write data of the continuous program command by subtracting a size of the stripe from the size of the write data of the continuous program command.

10. The operation method of claim 1, further comprising allocating, if the selected program command is a discontinuous program command, write data of the selected program command to the stripe.

11. The operation method of claim 10, wherein the allocating the write data of the selected program command to the stripe comprises:

allocating the write data of the selected program command to an empty area of the stripe when a size of the empty area of the stripe is greater than or equal to a size of the write data of the selected program command; and allocating a portion of the write data of the selected program command to the empty area of the stripe when the size of the empty area of the stripe is less than the size of the write data of the selected program command.

12. The operation method of claim 11, wherein the allocating the write data of the selected program command to the stripe further comprises:

selecting, when the size of the empty area of the stripe is greater than the size of the write data of the selected program command, additionally one program command from among the program commands stored in the command queue in order to allocate the write data of the additionally selected program command to the empty area of the stripe; and updating, when the size of the empty area of the stripe is less than or equal to the size of the write data of the selected program command, the size of the write data of the selected program command by subtracting a size of the allocated portion of the write data of the selected program command from the size of the write data of the selected program command.

13. A storage device comprising:

a memory device including a plurality of dies; and a memory controller configured to:

perform communication with at least one external device, generate signal for controlling operations of the memory device, receive, from the at least one external device, program commands and corresponding write data, store sequentially the program commands in a command queue in an order, in which the program commands are received, store the write data in a temporary buffer, select a program command from among the program commands stored in the command queue, determine whether the selected program command is a continuous program command or a discontinuous program command, and allocate, if the selected program command is a continuous program command, the write data of the selected program command to an entire area of a stripe that is a memory area formed over the plurality of dies, wherein the memory controller determines that the selected program command is the continuous program command when logical addresses for writing the write data of the selected program command are consecutive and a size of the write data of the selected program command is greater than or equal to a size of the stripe, wherein the memory controller is configured to:

receiving a continuous program command allocated to the entire area of the stripe while discontinuous data has already been allocated to a portion of a stripe, cancelling the allocation of the discontinuous data;

allocating a continuous data of the continuous program command to the entire area of the stripe;

subtracting a continuous data parameter indicating a data size of the selected program command by the size of the stripe; and determining again whether the selected program command is the continuous program command.

14. The storage device of claim 13, wherein the size of the stripe is determined by multiplying a number of the dies, a number of planes included in each of the dies and a size of a page.

15. The storage device of claim 14, wherein the memory controller stores the program commands by storing the program commands for each physical function (PF) in the command queue corresponding to each PF, and wherein the memory controller selects a program command having an earliest reception time from among the program commands at a foremost position in the command queue for each PF.

16. The storage device of claim 15, wherein the memory controller is further configured to allocate, when the selected program command is the discontinuous program command, the write data of the selected program command to the stripe by:

allocating the write data of the selected program command to an empty area of the stripe when a size of the empty area of the stripe is greater than or equal to a size of the write data of the selected program command, and allocating a portion of the write data of the selected program command to the empty area of the stripe when the size of the empty area of the stripe is less than the size of the write data of the discontinuous program command.

17. The storage device of claim 16, wherein, when write data of a previously selected program command has already been allocated to a portion of the stripe, the allocated data is a timeout data whose predetermined timeout period has lapsed, and the selected program command is the continuous program command, the memory controller further configured to:

cancel allocating of the write data of the selected program command to the entire area of the stripe, and select one discontinuous program command from among the program commands stored in the command queue in order to allocate, to an empty portion within the stripe, the write data of the selected discontinuous program command.

18. The storage device of claim 14, wherein the memory controller selects the program command by selecting a program command at a foremost position in the command queue.

* * * * *